(12) United States Patent
Bernard

(10) Patent No.: US 6,173,979 B1
(45) Date of Patent: Jan. 16, 2001

(54) VEHICLE RUNNING BOARD CONSTRUCTION

(75) Inventor: Edward Helmut Bernard, Ontario (CA)

(73) Assignee: Bernard Mould Ltd., Oldcastle (*) Notice: Under 35 U.S.C. 154(b), the term of this patent shall be extended for 0 days.

(21) Appl. No.: 09/303,274

(22) Filed: Apr. 30, 1999

(51) Int. Cl.$^7$ ........................................................ B60R 3/00
(52) U.S. Cl. ............................................. 280/163; 280/169
(58) Field of Search ................................. 280/163, 164.1, 280/166, 169; 182/90, 127, 151, 222, 228.2, 228.5, 64.1, 200

(56) References Cited

U.S. PATENT DOCUMENTS

| | | | |
|---|---|---|---|
| 1,876,849 | * | 9/1932 | Bronson ................................ 280/169 |
| 2,140,887 | * | 12/1938 | Tinnerman ........................... 280/169 |
| 4,935,638 | * | 6/1990 | Straka ................................ 280/164.1 |
| 4,943,085 | * | 7/1990 | Straka ................................. 280/770 |
| 5,193,829 | * | 3/1993 | Holloway et al. .................... 280/163 |
| 5,713,589 | * | 2/1998 | Delgado et al. ..................... 280/163 |

OTHER PUBLICATIONS

See attached Information Disclosure Statement Memorandum, dated May 1, 2000 (pp. 1–10), and "Prior Art A" (FIGS. 1–11), and "Prior Art B" (FIGS. 1–6).

* cited by examiner

Primary Examiner—Paul N. Dickson
Assistant Examiner—Bridget Avery

(74) Attorney, Agent, or Firm—Reising, Ethington, Barnes, Kisselle, Learman & McCulloch, PC

(57) ABSTRACT

An improved vehicle running board construction and method of making same including a hollow metal support pipe with an elongated mid-section step portion adapted in vehicle-mounted orientation to extend generally parallel to and adjacent a sill of a vehicle door that provides access to a passenger or freight compartment of the vehicle. An elongate mounting opening is formed in an upwardly facing exterior surface area of the pipe mid-section. A support plate has a plurality of transverse trusses arranged in spaced apart relation in a longitudinally extending row and straddling the opening side edges and resting thereon for support. A plurality of spacer webs are individually interposed between and joined to longitudinally adjacent pairs of the trusses and support at each of their longitudinally opposite ends, a resilient spring finger catch oriented to underlie an associated one of the pipe opening side edges. Each finger catch has a free end resiliently engaging an interior surface of the pipe for holding the step plate against upward release from the pipe. A step plate is mounted on and covers the support plate as well as the mounting opening of the pipe. The step plate has a generally flat planar central step tread portion with an undersurface bearing upon the support plate trusses. The step plate also has downwardly extending side flanges respectively extending outwardly of and downwardly past the pipe opening side edges and terminating at free end edges that preferably resiliently engage the exterior surface of the pipe. A plurality of retaining barbs extend downwardly from the step plate undersurface into snap lock tang engagement with associated receiving slot anchor tabs provided in the trusses for holding the step plate on the support plate, and vice versa.

15 Claims, 7 Drawing Sheets

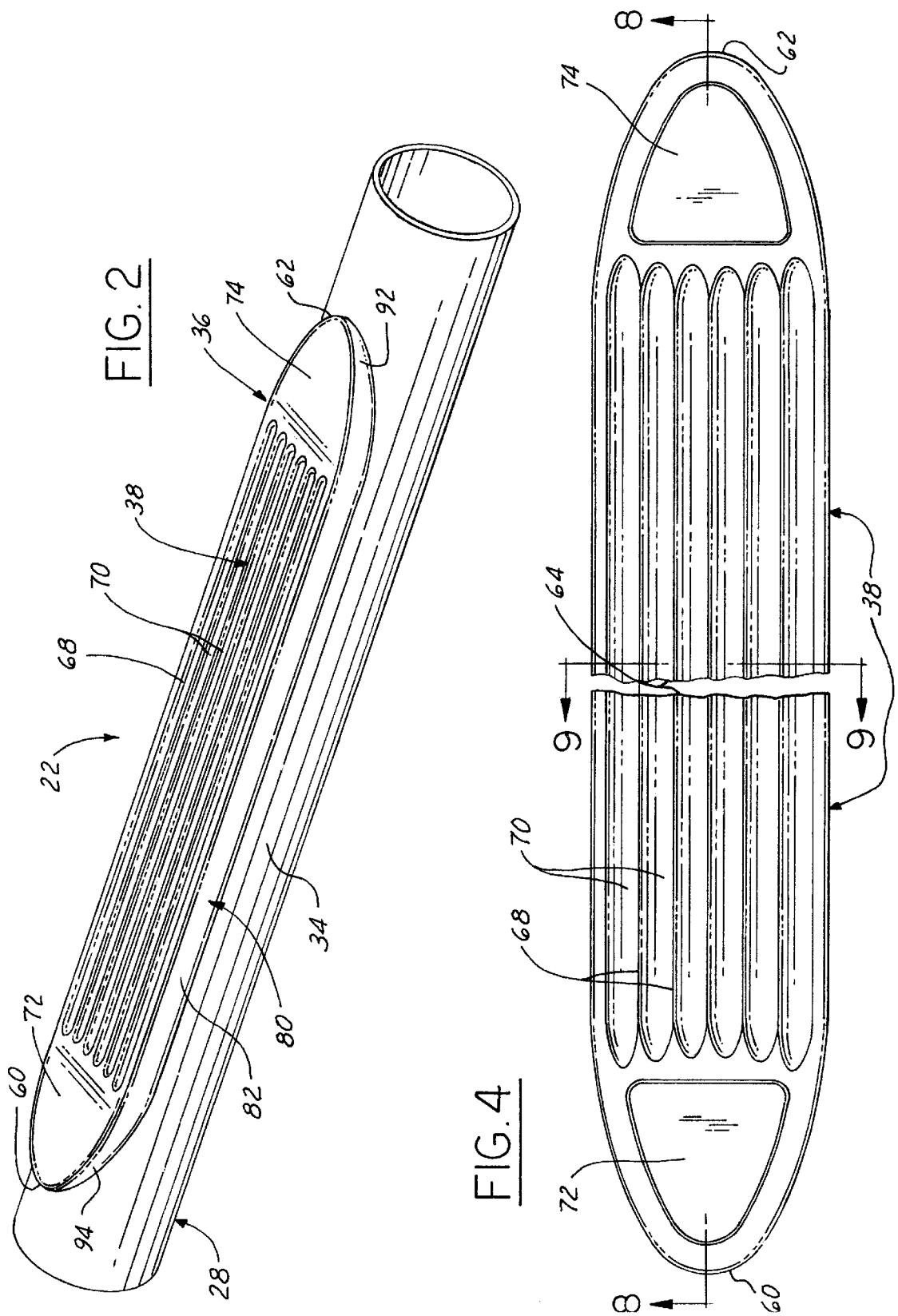

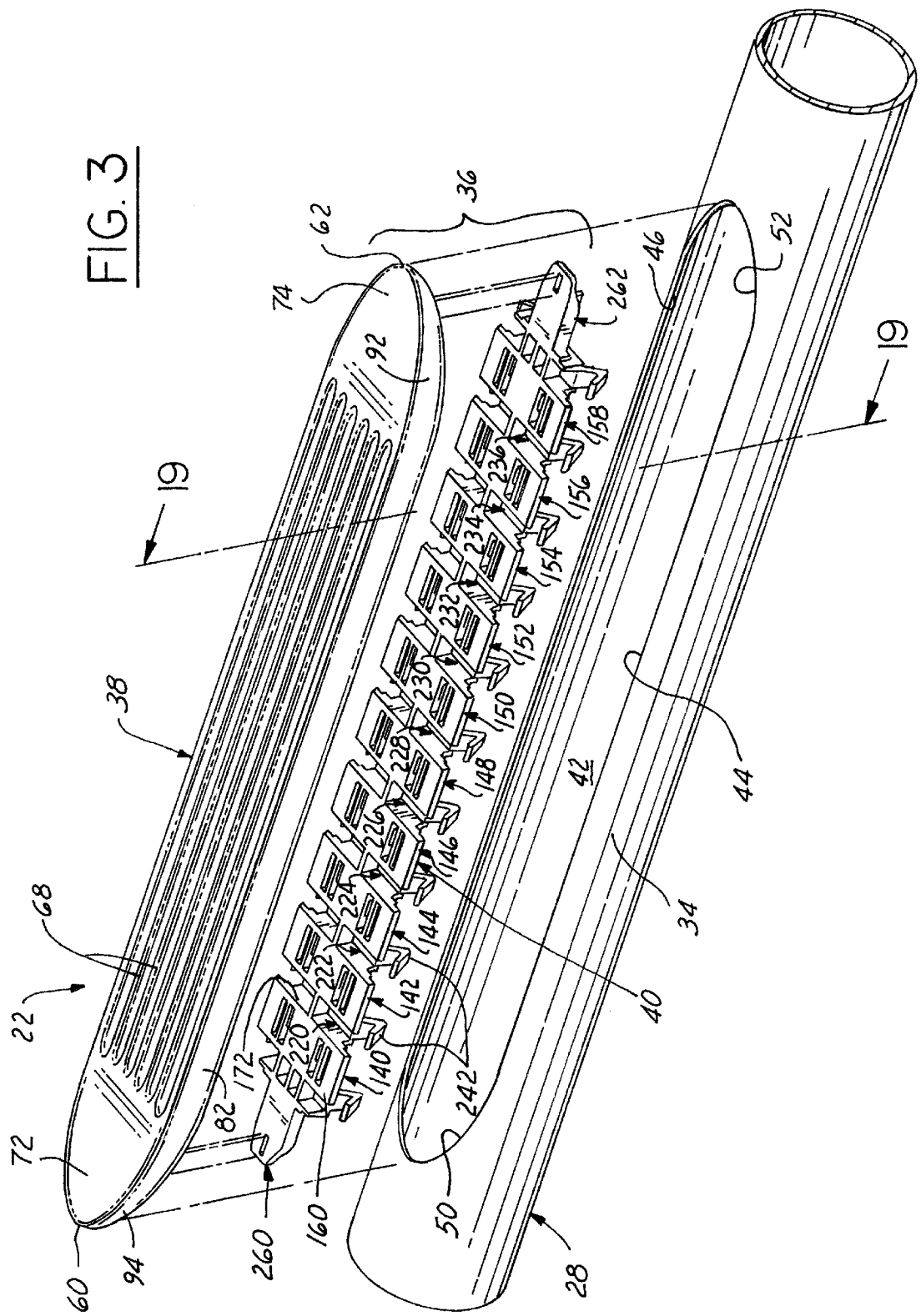

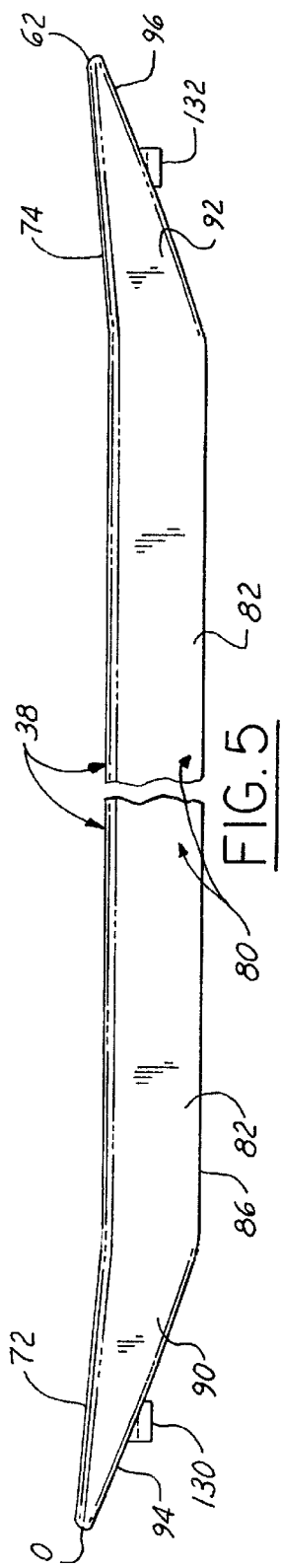
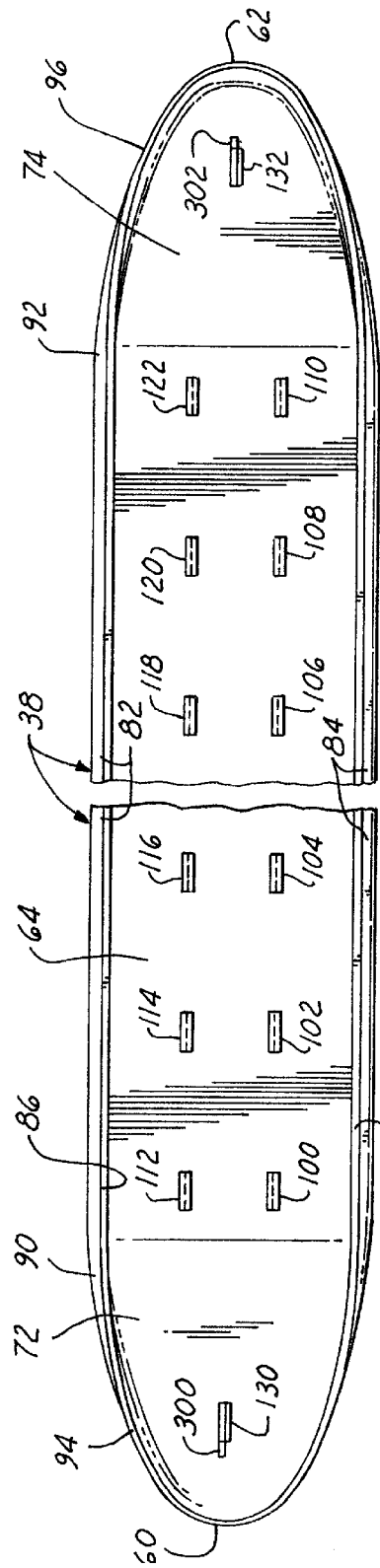
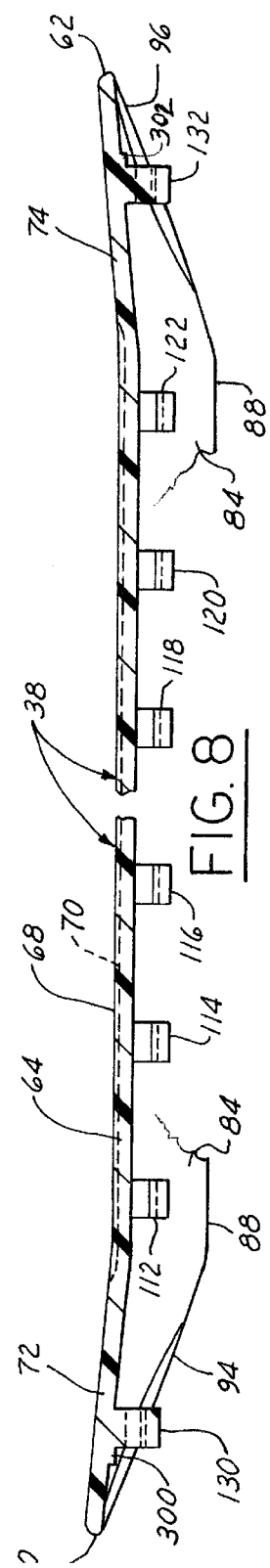

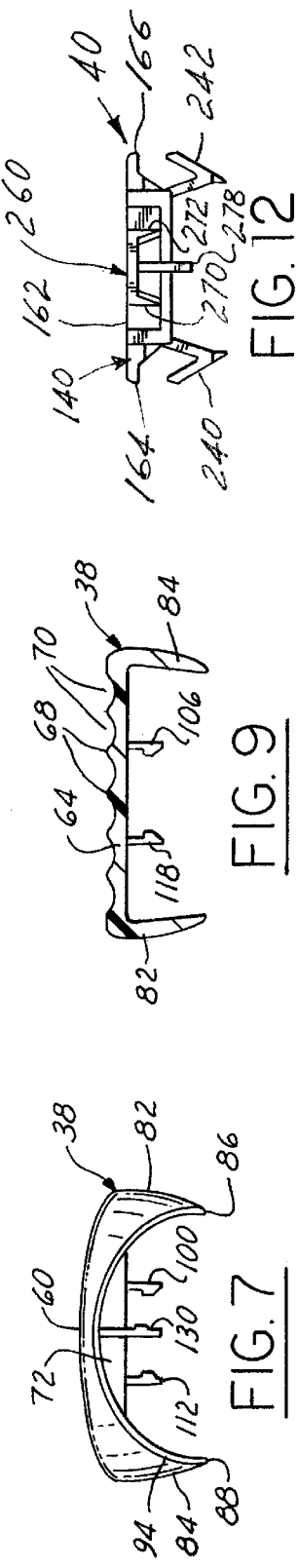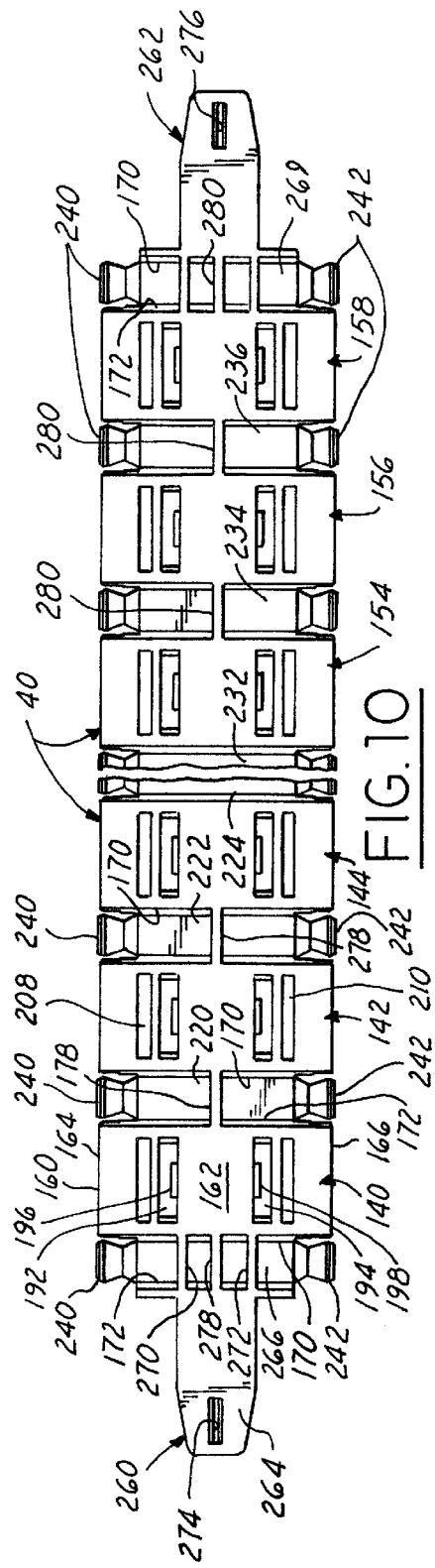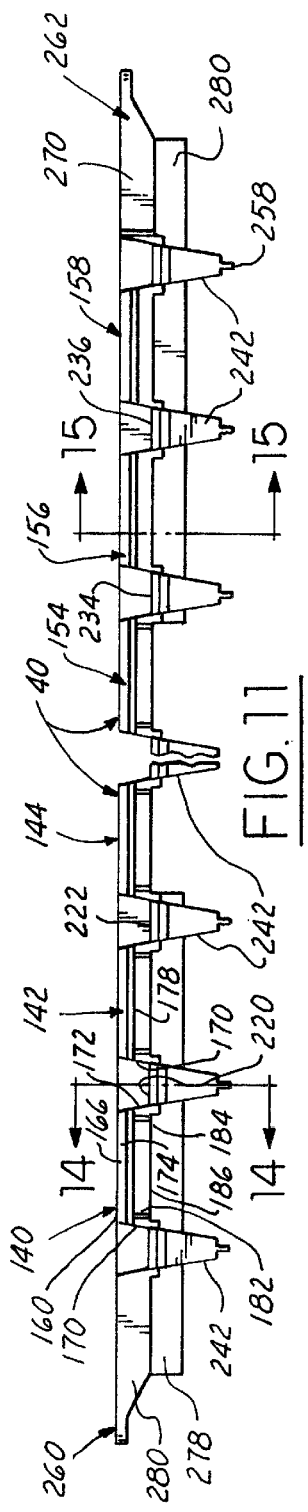

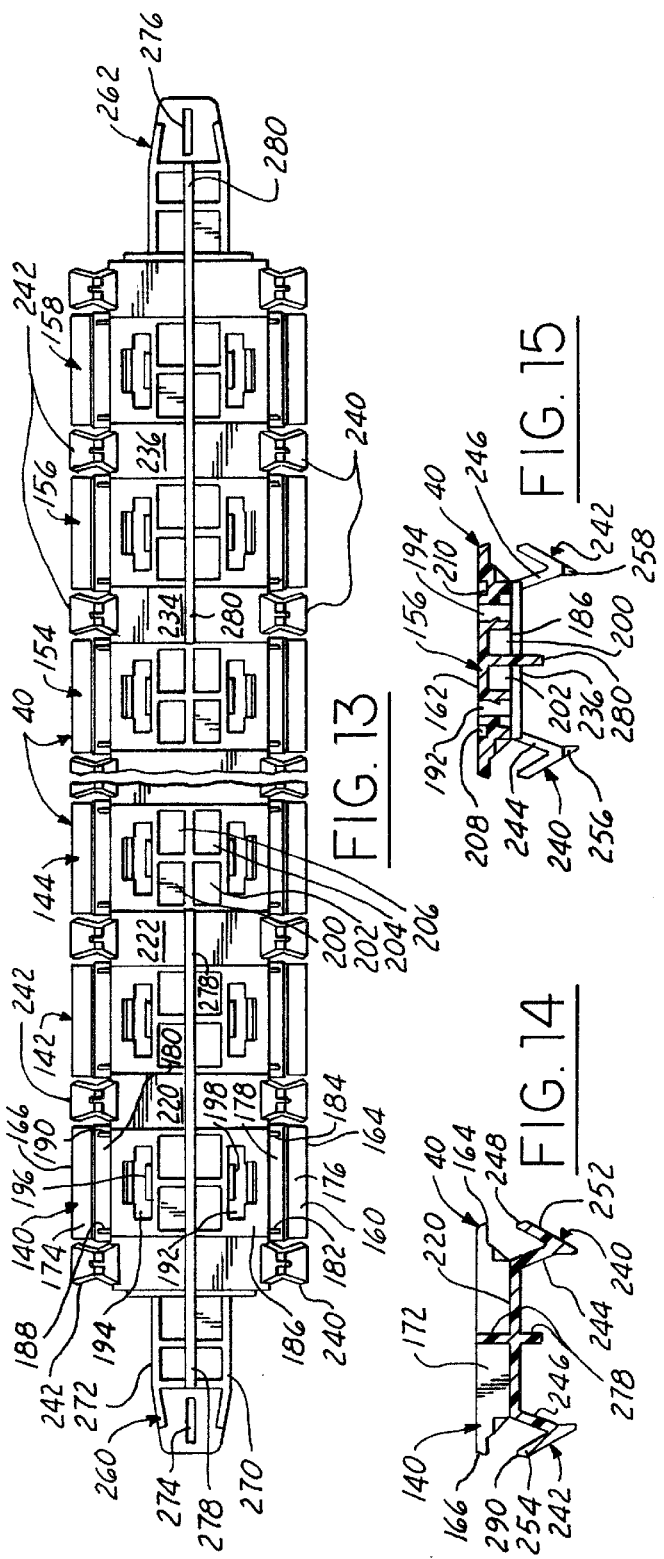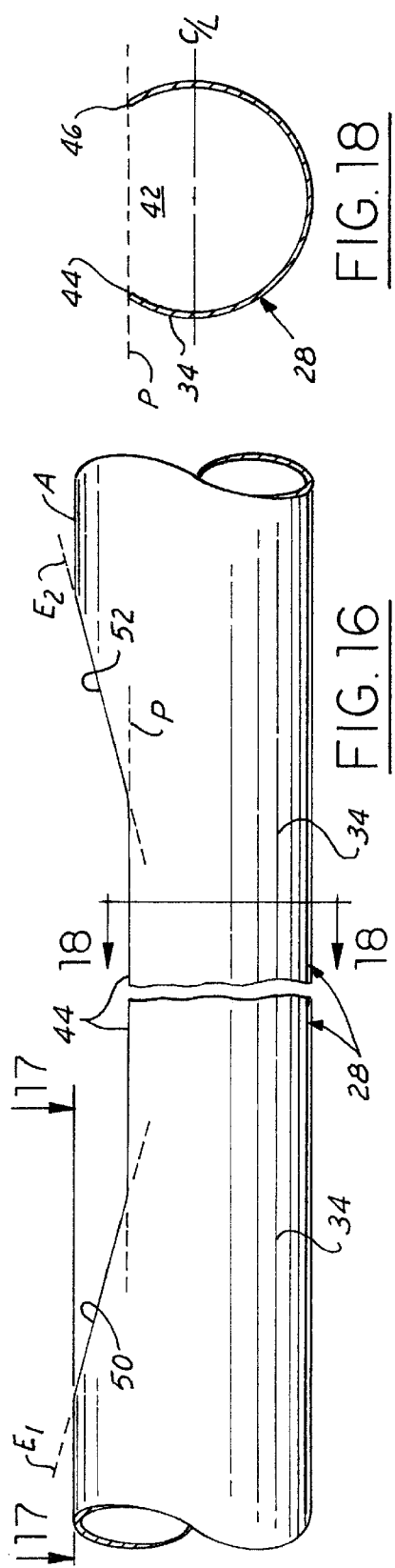

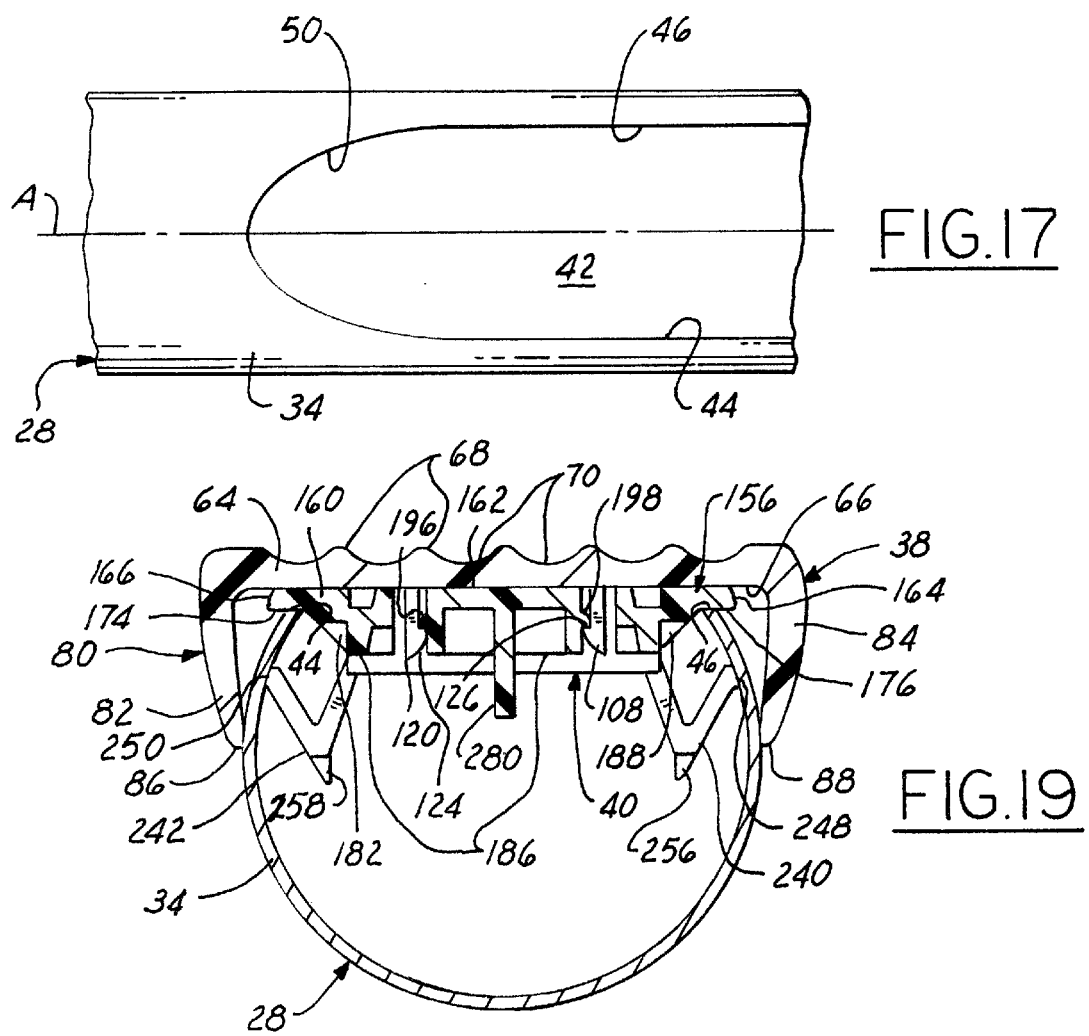

VEHICLE RUNNING BOARD CONSTRUCTION

FIELD OF THE INVENTION

This invention relates to automotive vehicle running board constructions, and more particularly to heavy duty tubular or bent-pipe type running boards or similar exterior mounted steps currently in use on various sport utility and pick-up truck type automotive vehicles.

BACKGROUND OF THE INVENTION

The wide spread popularity in recent years of pick-up trucks and sport utility vehicles for both on-road and off-road use in business, recreational as well as everyday travel has popularized the "rugged" styling of such vehicles, as well as their accessories, from both the practical as well as aesthetic standpoint. Thus the exterior running board construction provided for such vehicles, both as original equipment and after-market accessory type products, has seen the advent of a simple large tubular support, typically in the form of a two or three inch diameter steel pipe bent-formed at its opposite axial ends for connection to the undercarriage of the vehicle. A straight run central portion of the pipe is typically positioned outboard of and below the door sill of the cab of the pick-up truck or the front and/or rear doors of a sport utility vehicle (SUV). Such pipe running boards provide both the rugged strength and structural support required for such use, and are also resistant to damage from traveling through underbrush as well as from various other types of misuse encountered in the typical service life of such vehicles. Also, since the pipe is spaced outboard of the vehicle body metal it is easy to clean off, as by a hose-down, mud clinging to the surface of the pipe and to the step carried by the pipe.

Although the use of a simple pipe in and of itself has been proposed and marketed with some success, safety considerations require that a step plate of some type be mounted on top of the pipe and provided with a ribbed, corrugated or other contoured gripping pattern on its upper face. This insures safe and secure footing by users of the running board both during entry and departure from the vehicle passenger space, as well as when riding in a standing position on the running board. Hitherto, such a pipe and step plate running board construction has been provided by mounting a step plate, made as a plastic extrusion, onto the opposed edges of an upper cut-off section of a metal support pipe. The step plate was supported along its longitudinal center line by support a support beam in the form of a piece of untreated pine wood board inserted into the metal pipe. The board rested along its bottom longitudinal edge on the bottom interior of the pipe and was dimensioned so that its upper longitudinal edge abutted the underside of the plastic extrusion step plate. However, this arrangement tended to become loose and disassembled from use and abuse under normal wear and tear conditions, as well as from swelling of the wood support from water collecting in the pipe. Thus, this prior commercial construction did not provide a fully secure mounting of the step plate on the pipe and hence could be pried off during running through heavy brush or similar extreme but not unusual conditions encountered during the off-road use of such vehicles. Accordingly, it has been previously proposed (but not produced or reduced to practice) to provide a step plate/pipe running board construction in which the wood interior brace is replaced by an injection molded plastic member spanning the length and width of the interior of the pipe beneath the slotted portion of the pipe to serve as an insert support structure for a separately manufactured step plate to be mounted thereon. However, this proposed design presented problems as to its mounting assembly into a straight pipe section in order to capture the support member within the pipe, and involved an expensive and impractical procedure for assembly. Hence, this design was abandoned as being not satisfactory at least from the standpoint of secure mounting, ruggedness and/or economy of manufacture and assembly.

OBJECTS OF THE INVENTION

Accordingly, among the objects of the present invention are to provide an improved running board construction for installation and use on automotive vehicles such as pick-up trucks, SUVs and similar type vehicles wherein the aforementioned tubular pipe-type running board is employed in combination with an improved support plate member and an improved step plate member, and wherein the latter two members may be molded each as a one-piece member from plastic materials, wherein the step plate may be mounted to the support plate as a sub-assembly without use of separate fastening members and yet securely and reliably thereafter retained as a unitary sub-assembly, and wherein the step plate/support plate sub-assembly may be easily and securely mounted on the support pipe in a rapid and reliable manner, again without the use of separate fastening members.

Another object is to provide an improved running board construction of the aforementioned character that, once mounted on the running board pipe, provides a rugged and secure mount thereto that is able to withstand abuse, damage and resist pry-off removal from striking under brush and other similar forces, that is easily cleaned, that is mass producible by conventional injection molding processes and can be made in recyclable materials that are weather and moisture resistant and able to withstand the extremes of outdoor temperature conditions from dessert to arctic temperatures, that provides a safe, rattle-free, and squeak-proof standing platform mounted on the tubular pipe support and that has a long and useful service life, that is easily repairable and that is economical in construction and reliable in operation.

SUMMARY OF THE INVENTION

In general, by way of summary description and not by way of limitation, the invention accomplishes the foregoing and other objects by providing an improved vehicle running board construction comprising the aforementioned hollow metal support pipe adapted to be secured to a vehicle exterior at first and second longitudinally opposite ends of the pipe. The elongated mid-section step portion of the pipe is adapted in vehicle-mounted orientation to extend generally parallel to and adjacent a sill of a vehicle door that provides access to a passenger or freight compartment of the vehicle. An elongate mounting opening is formed in an upwardly facing exterior surface area of the pipe mid-section as defined by first and second laterally opposite and longitudinally extending opening side edges both lying in a plane chordally intersecting an upper radial cross sectional segment of the pipe. This opening is defined at opposite longitudinal ends thereof by first and second divergently inclined end edges each extending from the opening side edges to a junction with an uppermost apex area of the upwardly facing exterior surface area of said pipe.

The running board construction also includes a support plate having a plurality of transverse trusses arranged in spaced apart relation in a longitudinally extending row and straddling said opening side edges and resting thereon for support.

The support plate also has a plurality of spacer webs individually interposed between and joined to longitudinally adjacent pairs of the trusses. Each of these webs has, at each of the longitudinally opposite ends thereof, a resilient spring finger catch oriented to underlie an associated one of the pipe opening side edges. Each finger catch has a free end resiliently engaging an interior surface of the pipe for holding said step plate against upward release from the pipe.

The running board construction further includes a step plate mounted on and covering the support plate as well as the mounting opening of the pipe. The step plate has a generally flat planar central step tread portion with an undersurface bearing upon the support plate trusses. The step plate also has first and second downwardly extending side flanges respectively extending outwardly of and downwardly past the first and second pipe opening side edges. These flanges each terminate at a free end edge that preferably resiliently engages the exterior surface of the pipe. A plurality of retaining barbs extend downwardly from the step plate undersurface into snap lock tang engagement with associated receiving slot anchor tabs provided in the trusses for holding the step plate on the support plate, and vice versa.

Preferably each support plate truss has a planar top wall extending lengthwise perpendicular to the longitudinal dimension of the pipe, the truss top walls being co-planar with one another. Each of the trusses has a pair of sidewalls, one dependent from the leading and one from the trailing edges of each truss top wall. The spacer webs preferably each comprise a planar member extending in a plane parallel to the truss top walls and spaced therebelow. The opposite forward and trailing edges of each web wall are joined to the lower edges of the mutually adjacent truss sidewalls of a mutually longitudinally adjacent pair of the trusses.

Preferably each spring finger catch comprises a V-shaped member lying in a plane perpendicular to the longitudinal axis of the pipe. Each catch has a first leg that is integrally joined at its upper end to the end edge of an associated one of the spacer web walls and extends downwardly to a vertex of the V of the spring leg catch. Each catch also has a second leg extending upwardly and outwardly at an acute angle to the first leg from a junction at such vertex with the first leg, and terminates in a free end edge that forms the free end of the spring finger catch.

Preferably the support plate trusses, spacer webs and resilient spring finger catches are all integrally joined together by being injection molded with the support plate as a one-piece part, preferably from recyclable high strength thermoplastic material such as a polycarbonate.

Likewise, preferably the step plate side flanges and step plate retaining barbs are all integrally joined together by being injection molded with the step plate as a one-piece part, again perferably from a high strength recyclable plastic material such as thermoplast polyosalene containing some synthetic rubber material.

The invention also includes a method of constructing the vehicle running board construction that includes the steps of forming a sub-assembly of the plates by assembling the step plate onto the support plate by relatively moving said plates bodily toward one another while maintaining their respective longitudinal axes generally parallel until the retaining barbs have fully snap lock engaged the truss anchor tabs. Then an assembly of the support pipe with the sub-assembly is formed by relatively moving the sub-assembly and pipe bodily toward one another with the leading and trailing ends of the sub-assembly and pipe opening aligned and while maintaining their respective longitudinal axes generally parallel until the free ends of the catch second legs have been slid past the pipe opening edges and into the interior of the pipe and the step plate side flanges resiliently engage the exterior surface of the pipe.

BRIEF DESCRIPTION OF THE DRAWINGS

The foregoing as well as other objects, features and advantages of the present invention will become apparent from the following detailed description of the best mode presently known to the inventor of making and using the invention, from the appended claims, and from the accompanying drawings (which are to engineering scale unless otherwise indicated) wherein:

FIG. 2 is a fragmentary perspective view illustrating the mid-section straight-length portion of the support pipe of the running board construction of the invention embodiment of FIG. 1 with a step plate/support plate sub-assembly mounted thereon.

FIG. 3 is an exploded perspective view of the components shown in FIG. 2 illustrating the step plate disposed above the underlying support plate which in turn is shown disposed above the elongated mounting opening provided in the upper surface of the pipe mid-section.

FIG. 4 is a fragmentary top plan view of the step plate of the assembly of FIGS. 1, 2 and 3.

FIG. 5 is a fragmentary side elevational view of the step plate of FIG. 4.

FIG. 6 is a fragmentary bottom plan view of the step plate of FIGS. 4 and 5.

FIG. 7 is an end elevational view of the trailing end of the step plate, i.e., the right hand end as viewed in FIG. 5.

FIGS. 8 and 9 are cross-sectional views taken respectively on the lines 8—8 and 9—9 of FIG. 4.

FIG. 10 is a fragmentary top plan view of the support plate component shown by itself.

FIG. 11 is a fragmentary side elevational view of the support plate of FIG. 10 shown by itself.

FIG. 12 is an end elevational view of the trailing end of the support plate, i.e., the right hand end as viewed in FIGS. 10 and 11.

FIG. 13 is a fragmentary bottom plan view of the support plate of FIGS. 10–12.

FIGS. 14 and 15 are cross-sectional views taken respectively on the lines 14—14 and 15—15 of FIG. 11.

FIG. 16 is a fragmentary side elevational view of a portion of the mid-section of the support pipe of the running board construction shown in FIGS. 1–3, but shown by itself.

FIG. 17 is a fragmentary top plan view taken on the line 17—17 of FIG. 16.

FIG. 18 is a cross-sectional view taken on the line 18—18 of FIG. 16, and FIG. 19 is a cross-sectional view taken on the line 19—19 of the exploded view of FIG. 3 but showing the parts non-exploded in assembled relation as in FIG. 2.

DETAILED DESCRIPTION OF PREFERRED EMBODIMENT

Figure 1:
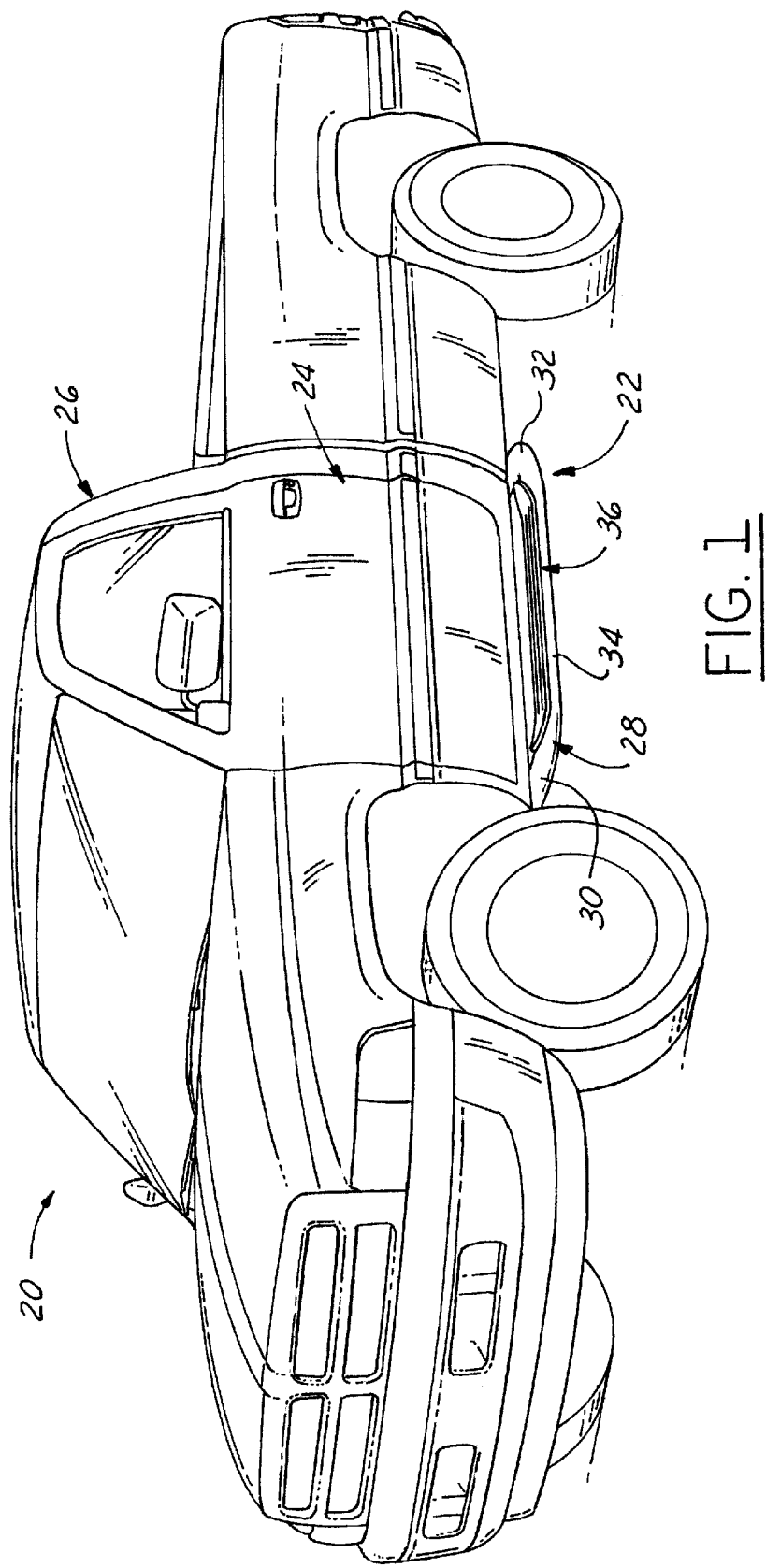
FIG. 1 is a perspective view of a current model pick-up truck illustrating one preferred embodiment of a running board construction of the invention mounted to the underside of the vehicle and extending outboard of and adjacent the sill edge of the driver-side door of the truck cab.

Referring generally to FIG. 1, a current model pick-up truck 20 is shown with a preferred but exemplary embodiment of a pipe-type running board construction 22 of the invention mounted to the underframe of the vehicle and positioned for use as a running board for the driver-side door 24 of the truck cab 26. The running board construction 22 comprises a hollow support pipe 28 having bent-formed opposite longitudinal ends 30 and 32 respectively that extend beneath the vehicle and are mounted in a conventional manner to the vehicle frame. Pipe 28 has a generally straight mid-section portion 34 extending between ends 30 and 32 that supports a step plate/support plate sub-assembly 36 provided in accordance with the invention.

As best seen in FIG. 3, the step plate/support plate sub-assembly 36 is made up of two one-piece molded plastic components, namely a step plate 38 that is snap-tang-lock mounted on a support plate 40 that in turn is snap-spring-finger-catch installed in an elongated mounting opening 42 (FIGS. 3 and 16–18) provided in the upwardly facing approximately 90° circumferential surface area of pipe mid-section 34.

Support pipe 28, by way of preferred example, may be a hollow stainless steel pipe section having an outside diameter of about three inches and a wall thickness of one sixteenth inch. Alternatively, the pipe may be made of a suitably aluminum alloy material. In a typical installation the axial or longitudinal dimension of the mid-section 34 of pipe 28 may run from six to sixty inches, depending upon the vehicle application. The mounting opening 42 in pipe mid-section 34 is defined by pair of parallel, longitudinally extending and laterally opposite side edges 44 and 46 (FIGS. 3 and 16–18) that lie in an imaginary horizontal (in-use orientation) cut plane P (perpendicular to the plane of the drawing in FIG. 18) disposed approximately half way between the horizontal center line C/L of tube section 34 (FIG. 18) and the apex A of the uppermost surface area of the complete circular section of pipe section 34 (FIGS. 16 and 17). The opposite ends of mounting opening 42 are defined by cut planes $E_1$ and $E_2$ (FIG. 16) that extend perpendicular to the plane of the drawing in FIG. 16. The end cut planes $E_1$ and $E_2$ thus respectively form the elliptical curved end edges 50 and 52 (FIGS. 3 and 17) characteristic of the intersection of a plane intersecting a cylinder at an acute angle to the cylinder axis.

Step plate 38 is preferably made as a one-piece injection molded part from a suitable recyclable high strength, high melting point thermoplastic material, such as thermoplast polyosalene, and preferably containing some suitable synthetic rubber material. Plate 38 has an appropriate lengthwise dimension parallel to its longitudinal axis so that when mounted to pipe mid-section 34 the opposite longitudinal ends 60 and 62 of plate 38 axially overlap and cover the end edges 50 and 52 respectively of opening 42 (FIG. 2). As best seen in FIG. 19, plate 38 has an inverted U-shape in transverse cross section as defined by a tread platform or deck portion 64 provided with a peripherally encircling dependent side edge flange 80. Deck 64 has a smooth undersurface 66 bearing on the upper surface of support plate 40. Deck 64 has a suitable tread configuration on its upper surface made up of parallel longitudinally extending ribs 68 that alternate with grooves 70 to provide good footing or traction to a person standing on step plate 38. Preferably the friction grip of the deck upper surface is further enhanced by providing a conventional acid etched stipple grain finish on this surface. The ribs 68 and grooves 70 terminate at their opposite longitudinal ends at the bases slightly inclined smooth forward and aft (i.e., leading and trailing) deck areas 72 and 74 that are each inclined upwardly from the major plane of platform at a slight angle, say 10°, as best seen in FIG. 8. As best seen in FIGS. 4 and 6, these inclined end deck areas 72 and 74 in plan view are generally bullet-nose shaped so that the overall configuration of plate 38 is generally canoe-shaped in plan view.

The downwardly dependent flange 80 integral with platform 64 and end deck portions 72 and 74 surrounds substantially the entire outer periphery of these portions of plate 38. Flange 80 thus has an outboard portion 82 integral with the outboard edge of platform 64, and an inboard (closest to vehicle) flange 84 integral with the inboard edge of platform 64. As best seen in FIG. 19, the lower free end edges 86 and 88 of flange portions 82 and 84 are preferably designed such that, when step plate 38 is in assembly with pipe 28 and support plate 40, these edges yieldably and resiliently engage the outer surface of pipe section 34 at approximately the horizontal mid-plane thereof. Thus, the molded free-state condition of flange portions 82 and 84 has a span distance slightly less than the chordal dimension of pipe 34 at the engagement points of tips 86 and 88 so that the flanges 82 and 84 are resiliently cammed apart during installation and retain a tight embracing and generally water tight fit with the outer surface of pipe section 34.

Flange 80 in the portions 90 and 92 thereof contiguous with the inclined end platform portions 72 and 74 respectively terminate in a lower edge 94 and 96 (FIGS. 5, 6 and 8) that is inclined upwardly from the junction with lower edges 86 and 88 at oppositely inclined angles generally matching the angles of inclination of cut planes $E_1$ and $E_2$ that define the end edges 50 and 52 of opening 42.

The underside of step plate 38 is provided with a plurality of locking tangs preferably arranged, as best seen in FIGS. 6, 7,8 and 9, in a longitudinally extending inboard row of tangs 100, 102, 104, 106, 108, 110 and a longitudinally extending outboard row of tangs 112, 114, 116, 118, 120 and 122 that protrude integrally downwardly from the platform 64 of plate 38. Each locking tang 100–122, as best seen in FIGS. 7, 9 and 19, is provided with a leading end having an inclined camming surface 124 extending divergently back toward platform surface 66 and terminating in a locking ledge or shoulder 126 (FIG. 19), and functions as described in more detail hereinafter. Similar but slightly longer centrally located forward and aft locking tangs 130 and 132 depend from the fore and aft end platforms 72 and 74 and are likewise configured with an inclined leading camming surface terminating in a locking shoulder surface that is generally parallel to the undersurface 64 of plate 38.

The construction and details of support plate 40 are best seen in FIGS. 3 and 10–15 as well as in FIG. 19. Support plate 40 is preferably made as a one-piece molded part, preferably injection molded from a suitable recyclable plastic material such as a high strength, high melting point polycarbonate material, and includes a plurality of weight-load bearing truss means that in the disclosed example total ten in number. These truss means are individually identified by truss reference numerals 140, 142, 144, 146, 148, 150, 152, 154, 156 and 158 in FIG. 3, are arranged in a longitudinally extending row and are equally longitudinally spaced from one another. Each of these trusses 140–158 is identical in construction and configuration and hence the forward-most or leading truss 140 will only be described in detail. Truss 140 comprises a planar top wall 160 of rectangular configuration in plan view (FIG. 10) and having a smooth, flat planar upper surface 162 (FIGS. 10–12 and 19), and longitudinally opposite ends 164 and 166 that are spaced apart a suitable distance so as to extend in assembly with pipe 28 beyond pipe opening edges 44 and 46 as shown in FIG. 19. Each truss section 140–158 also has a pair of laterally spaced downwardly divergent sidewalls 170 and 172 (FIGS. 10, 11 and 14) that provide vertical load bearing and bending-stress-resistant supports for top wall 160. The bottom surface of wall 160 is a stepped configuration symmetrical about the longitudinal center line of plate 40 (FIGS. 11, 13, 15 and 19) made up of ledge supporting surfaces 174 and 176 that bear upon pipe opening edges 44 and 46 respectively (FIG. 19). Ledge surfaces 174 and 176 are inwardly bounded by shoulder portions 178 and 180 that help restrain sliding motion of plate 40 on edges 44 and 46 in a direction perpendicular to the pipe axis. Reinforcing gussets 182 and 184 are also provided between shoulder 178 and the adjacent side surfaces of the truss bottom wall that extend downwardly to the plane of the major flat bottom wall surface 186 of truss section 140 (FIGS. 13 and 19). Corresponding gussets 188 and 190 are provided at the opposite longitudinal end of truss section 140. These gussets help brace support ledges 164/176 and 166/174 since the truss sidewalls 170 and 172 do not underlie these ledges but rather terminate flush with the outer edges of the major bottom surface 186.

Each truss section 140 also has a pair of tang-receiving through openings 192 and 194 of rectangular cross section (FIG. 10), each inboard side of which has a locking lug 196 and 198 respectively protruding into the opening and configured in vertical cross section, as best seen in FIG. 19, to cooperate with the associated tang 100–122 of step plate 38 to form a one-way catch construction for holding step plate 38 on support plate 40 in assembled relation. The undersurface of each truss is also provided with four rectangular pockets 200, 202, 204 and 206 (FIG. 13) to reduce weight and material in each truss section, leaving an intervening cruciform rib pattern for increasing the strength-to-weight ratio of the truss section. Likewise, the upper surface 162 of each truss is provided with a pair of weight-reducing rectangular pockets 208 and 210 adjacent each of the tang through openings 192 and 194 respectively, and also leaving a rib therebetween.

Each of the truss sections 140–158 that laterally span pipe opening 42 in assembly therewith is spaced from its longitudinally adjacent truss section(s) and integrally connected thereto by the associated one of a plurality of web walls 220, 222, 224, 226, 228, 230, 232, 234 and 236 (FIG. 3). Each of these web walls 220–236 is integrally joined along its side edges to the bottom of the flanking sidewalls 170 and 172 of the mutually adjacent pair of truss sections 140–158. In addition to serving as a longitudinal spacer between truss sections, each web wall 220–236 adds further lateral stiffness and structural modulus to the support plate 40, by imparting a corrugated overall configuration to the support plate in vertical cross section along the longitudinal axis of the same. In addition, each web wall 220 provides support for a pair of V-shaped spring catches 240 and 242 integrally joined one to each of the opposite longitudinal ends of each web wall 220–236.

The construction of spring catches 240, 242 is shown in FIGS. 10–15 and 19. It will be seen that the inboard leg 244 of catch 240, and the corresponding mirror image inboard leg 246 of catch 242 (FIG. 14), is integrally joined at its upper edge to the respective end edge of the associated web wall 220, 222, etc. so that the catches are cantilever supported therefrom. ("Integral" as used herein means joined together or united by being molded in one piece). The free end edges 248 and 250 of the outboard legs 252 and 254 of catches 240 and 242 respectively (FIG. 14) are spaced apart from one another in their free-state condition a distance slightly greater than the span between the end edges 164 and 166 of top wall 160 of each truss section. The vertex of each spring catch 240, 242 is provided with a downwardly pointing V-shaped entrance protrusion 256, 258 respectively (FIGS. 15 and 19) to provide a "lead-in" extension of the tapering entrance surface to facilitate downward insertion assembly of support plate 40 into opening 42 of pipe section 34.

Each of the opposite longitudinal ends of support plate 40 is constructed with a symmetrical mirror image configuration providing longitudinal leading and tailing end anchoring tabs 260 and 262 extending longitudinally from longitudinally opposite end truss portions of the support plate (FIG. 3). A top wall 264 (FIG. 10) of each of the tabs 260 and 262 extends from the free end of the tab toward the body of plate 40 to a junction with a transverse dependent wall 172 joined to another web wall 266, in the case of forward tab 264, and in the case of aft or rearward tab 262, to a sidewall 170 joined to a web wall 268 in turn joined to the sidewall 172 of truss 158 (FIG. 10). Each of the ends tabs 260, 262 has generally, in transverse cross section, an inverted-U-shape as defined by sidewalls 270 and 272 (FIGS. 11, 12 and 13) that continue across associated web wall 266 and 268 to form reinforcing struts between the associated cross walls 170 and 172 (FIG. 10). Each end tab 260, 262 is provided with a through slot 274 and 276 respectively that respectively receive the central catch-tang 130 and 132 (dependent from step plate 38 as described previously) when step plate 38 is assembled to support plate 40 to form the initial step plate/support plate sub-assembly 36 (FIG. 3).

The opposite longitudinal ends of support plate 40 are further reinforced by a pair of stiffening ribs 278 and 280 (FIGS. 10–15 and 19). The forward stiffening rib 278 extends along the central vertical plane of support plate 40 beneath front tab 260 (FIGS. 11 and 13), and back to the forward sidewall 170 of truss 144. The upper edge of rib 270 is flush with the top surface plane of support plate 40 throughout the length of the rib, and likewise protrudes below the plane of the web walls beneath the support plate 40. The rear stiffening rib 280 is constructed in like manner and symmetrically to rib 278 and the corresponding associated structure of the support plate 40.

Assembly Procedure

As indicated previously, step plate 38 is injection molded as a one-piece part separately from the remaining components, and preferably likewise as to support plate 40. Preferably, step plate 38 is constructed such that flange 80 is semi-resilient and hence somewhat pliable. Hence when support plate 40 is inserted bodily into step plate 38, with its then respective axes oriented longitudinal parallel, to the outboard free end edges 248 and 250 of the spring catches of support plate 40 can be inserted past the bottom edges 86 and 88 of the side flanges 82 and 84 while these flanges are suitable fixture-held flexed apart to facilitate passage of the catch-finger free ends. Preferably this is done on a suitable assembly jig so that the locking tangs 100–122 are axially aligned with their associated tang-receiving openings 192, 194 in support plate 40. Also, this sub-assembly procedure is preferably performed while step plate 38 is still at an elevated temperature following de-molding so as to take advantage of the greater softness and flexibility of the flanges while reaching final cure and room temperature conditions.

As the inclined leading surface of each tang 100–122 engages the inclined surface of the locking tabs 196 and 198 in each of the associated openings 192 and 194, the respective locking tangs will be cammed or wedge-forced so as to flex to thereby permit passage of the barb of the locking tang past the locking barbs or lugs 196, 198 of the associated tang-receiving opening in the support plate. As the bottom surface 66 of the step plate seats on the upper surfaces 162 of the support plate, the tangs 100–122 will snap into catch relationship with lugs 194 and 196 in a one-way locking-tang-catch relationship. Hence, step plate 38 cannot be pulled apart from support plate 40 merely by exerting separation forces on these two parts, short of exerting a destructive force capable of shearing the locking tangs and/or lugs. After assembly of the support plate to the step plate to form the sub-assembly 36, and release from the assembly fixtures, the side flanges 82 and 84 return to their original as-molded free-state condition.

The step plate/support plate sub-assembly 36 is assembled to the running board pipe 28 by aligning the front and rear ends 60 and 62 of step plate 38 with the front and rear ends of pipe opening 42 in axially overlapping relationship therewith. The registry of the parts for vertical lateral bodily insertion of the sub-assembly 36 into the opening 42 is done by aligning the forward edge of an abutment tab 300 (FIGS. 6 and 8), which depends from the undersurface of forward platform 72 forward of leading edge of tang 130, with the apex of the leading edge 50 of opening 42. Likewise, the trailing edge of another abutment lug 302, that depends from platform 74 of step plate 38 adjacent locking tang 132, is aligned with the apex of the trailing edge 52 of opening 42. Then sub-assembly 36 is loaded onto and into pipe opening 42 by moving it bodily, preferably with its longitudinal axis oriented parallel to that of pipe section 34, in a direction perpendicular to the longitudinal axes of these components. This relative assembly motion initially engages the outer surfaces of the spring legs 252 and 254 of spring catches 240 and 242 with the side edges 46 and 44 respectively of opening 42. This will laterally center the sub-assembly with its axis aligned vertically with the axis of the pipe section (when oriented as in FIG. 19). When such initial contact is made, it will be seen from FIG. 19 that the lower free end edges 86 and 88 of the side flanges 82 and 84 of the step plate 38 are spaced slightly outboard of the exterior surface of pipe section 34, respectively being disposed radially outwardly and overlapping the opening edges 44 and 46. Hence, as jig assembly force is exerted on pipe section 34, opposing the assembly force being exerted on sub-assembly 36, to move the two major components toward one another, the spring catches 240 and 242 will flex in the free legs 252 and 254 in the inboard legs 244 and 246 and also about the cantilever integral junction with the associated web wall. This permits the pipe opening edges 44 and 46 to slide along the surfaces of the outboard legs of the spring catches until the free ends 248, 250 thereof clear these pipe opening edges 44 and 46. The leg free ends 248, 250 then slidably engage the interior surface of the pipe section 34.

During this assembly motion the free edges 86 and 88 of flexible flanges 82 and 84 initially strike the exterior surface of pipe section 34 approximately in the zone thereof aligned with the spring catch outboard leg free ends 248 and 250 when in final assembled relationship, as in FIG. 19. Then during the completion of the assembly motion of the major components together to the assembled position of these components in FIG. 19 the curvature of the pipe section cams the free ends 86 and 88 of flanges 82 and 84 mutually apart to thereby resiliently stress the same so that they tightly resiliently engage the pipe surface as they reach their final assembled position shown in FIG. 19. In this condition the fore and aft relative motion of the sub-assembly 36 relative to pipe section 34 is limited by the abutments 300 and 302 respectively striking the associated apices of the pipe opening end edges 50 and 52. This longitudinal range of shifting may be on the order of say one eighth of an inch, whereas the overlap of the ends 60 and 62 of step plate 38 relative to the apices of opening end edges 50 and 52 is a matter of say one half inch or so.

The semi-resilient nature of the spring legs 240 and 242 renders them relatively stiff springs which require significant assembly force even though assembly is facilitated by the camming angle provided by the V-shape of the spring catches. Retrograde or removal motion of the sub-assembly 36 from pipe section 34 is therefore strongly resisted by the geometry and construction of the spring catches relative to the curvature of the pipe, and the difference in the radial dimension of the opening edges 44 and 46 from the pipe center line relative to the similar dimension of the free end edges of the outboard legs of the spring catches, i.e., a substantial amount of interference for this essentially one-way interference insertion assembly mode.

It thus will be seen in the mass production set-up for an automotive parts manufacturer, suitable assembly jigs (not shown) can be relatively simple and yet perform the two-step assembly operation in rapid sequence. The one-way locking tangs integrally dependent from the underside of step plate 38 provide a very strong and secure one-way catch with an associated support plate 40 so that the resultant sub-assembly 36 can be handled as such reliably without danger of component separation in the manufacturing process. Likewise, when sub-assembly 36 is drop-in, snap-engaged assembled with running board pipe 28, there is again a snap-in one-way type engagement that is readily accomplished rapidly and reliably and yet provides a rattle-proof, squeak-free and secure fit and spring-stressed retention of these components one with another during adverse usage and over an extended service life in use.

Due to the one-way locking tangs between step plate 38 and support plate 40 on the one hand, and the one-way resilient spring-finger engagement between support plate 40 and the running board pipe section 34 on the other hand, fitting together in assembly and retention thereafter of the finished assembly components is accomplished without the use of extraneous or separate fastening members such as screws, bolts or the like. However, if desired, such separate fastening members, whether they be conventional threaded fasteners, pop rivets, blind rivets, etc. can be employed to secure step plate 38 onto support plate 40, either in addition to or in lieu of the locking tangs 100–122 and 130 and 132.

It will be understood that the lengthwise dimension of step plate 38 and the corresponding dimension of support plate 40 can be varied to suit the application requirements and the length of the straight section 34 of the running board pipe 28. It is also to be understood that in some applications two or more pairs of locking tangs 100–122 of the step plate 38 can be omitted from the row of pairs of locking tabs between the opposite extremes in the row, if desired to reduce molding and material costs. Also, for larger length sizes of step plate 38, the support plate 40 alternatively can be made up of two or more sections molded successively from a single shorter length mold cavity in order to economize on mold cost. These sections then are held in longitudinal end-to-end abutment by their respective snap engagement with associated step plate tangs 100–122.

It also will be apparent from the foregoing description to those skilled in the art that the running board construction as described hereinabove with reference to the accompanying drawings fully and amply fulfills the aforestated objects of the invention. The running board construction of the invention also provides many advantages over the aforementioned prior art constructions in terms of stronger more reliable assembly and rattle-proof and squeak-free operation, extended service life, ease of assembly, economy of manufacture, weatherproof durability of materials, absence of extraneous or separate fastening members, pleasing aesthetic and appearance qualities, and good traction and footing for boarding and unboarding of the vehicle as well as standing on the running board while the vehicle is standing still or traveling.

Indeed, in a test of a working prototype constructed pursuant to the embodiment described and illustrated hereinabove the failure mode occurred under a statically applied solitary weight loading of about 1300–1400 psi, thereby greatly exceeding the initial design criteria of failure at about 300 psi applied at any given point on the step plate. The running board construction of the invention has thus been proven to have a high strength-to-weight ratio achieved at a very low cost.

It is also to be understood that support plate 40 can be first molded as a separate piece and then used as an insert in a mold cavity designed for overmolding step plate 38 onto support plate 40 in order to make sub-assembly 36.

What is claimed is:

1. A vehicle running board construction comprising in combination a hollow support step pipe adapted to be secured to a vehicle exterior at first and second longitudinally opposite ends of said pipe, said pipe having an elongated mid-section step portion adapted in vehicle-mounted orientation to extend generally parallel to and adjacent a sill of a vehicle door that provides access to a passenger or freight compartment of the vehicle, said pipe mid-section having an elongate mounting opening formed in an upwardly facing exterior surface area thereof and defined by first and second laterally opposite and longitudinally extending opening side edges both lying in a plane chordally intersecting an upper radial cross sectional segment of said pipe, said opening being defined at opposite longitudinal ends thereof by first and second end edges each extending from said opening side edges to a junction with an uppermost apex area of said upwardly facing exterior surface area of said pipe, a support plate having a plurality of truss means straddling said opening side edges and resting thereon for support, a plurality of spacer web means individually interposed between and joined to longitudinally adjacent pairs of said truss means, each of said web means having at each longitudinally opposite end thereof a resilient spring finger catch underlying an associated one of said pipe opening side edges and having a free end resiliently engaging an interior surface of said pipe for holding said step plate against upward release from said pipe, and a step plate mounted on and covering said support plate and said mounting opening of said pipe, said step plate having a generally flat planar central step tread portion having an undersurface bearing upon said support plate truss means, said step plate also having first and second downwardly extending side flanges respectively extending outwardly of and downwardly past said first and second pipe opening side edges and each terminating at a free end edge resiliently engaging the exterior surface of said pipe, and fastening means securing said step plate onto said support plate.

2. The combination of claim 1 wherein said fastening means comprises a plurality of retaining barbs extending downwardly from said step plate undersurface into snap lock tang engagement with associated receiving slot anchor tabs provided in said truss means for holding said step plate on said support plate.

3. The combination of claim 1 wherein each of said support plate truss means has a planar top wall extending lengthwise perpendicular to the longitudinal dimension of said pipe, said truss means top walls being co-planar with one another, and wherein each of said truss means has a pair of sidewalls, one dependent from the leading and one from the trailing edges of said truss means top wall, and wherein each said web means comprises a planar member extending in a plane parallel to said truss means top walls and spaced therebelow, the opposite forward and trailing edges of each said web wall being joined to the lower edges of the mutually adjacent sidewalls of a mutually longitudinally adjacent pair of said truss means.

4. The combination set forth in claim 3 wherein each said spring finger catch comprises a V-shaped member lying in a plane perpendicular to the longitudinal axis of said pipe and having a first leg integrally joined at its upper end to the end edge of an associated one of said web walls, said first leg extending downwardly to a vertex of said V of said spring leg catch, said V-shaped spring finger catch having a second leg extending from a junction at said vertex with said first leg upwardly and outwardly at an acute angle to said first leg and terminating in a free end edge defining said free end of said spring finger catch.

5. The combination set forth in claim 4 wherein said support plate plurality of truss means, said support plate spacer web means and said resilient spring finger catches are all integrally joined together by being molded with said support plate as a one-piece part.

6. The combination set forth in claim 5 wherein said support plate is injection molded from plastic material comprising a high strength, high melting point polycarbonate.

7. The combination set forth in claim 6 wherein said step plate side flanges and said step plate retaining barbs are all integrally joined together by being molded with said step plate as a one-piece part.

8. The combination set forth in claim 7 wherein said step plate is formed by being injection molded from plastic material comprising a high strength, high melting point thermoplast polyosalene material.

9. The combination set forth in claim 1 wherein said first and second end edges of said opening in said support pipe are respectively defined by cut planes inclined at a shallow angle upwardly relative to the longitudinal axis of said pipe and extend in oppositely divergent directions at the respectively axially opposite ends of said opening, and wherein said step plate has bullet-nose shaped end platforms at each of the axially opposite longitudinal ends thereof inclined to conform to the cut plane of the end edges of said pipe opening and covering the same in assembly.

10. The combination set forth in claim 9 wherein said step plate is formed with a longitudinally extending and laterally alternating row of grooves and ridges to form a tread pattern thereon.

11. The combination set forth in claim 9 wherein said side flanges of said step plate comprise a portion of and are integrally joined to a single flange of said plate encircling the entire periphery thereof and resiliently sealably engaging the exterior surface of said pipe in surrounding relation to the entirety of said edges of said pipe opening.

12. The combination set forth in claim 3 wherein said support plate has leading and trailing tab portions having snap-tang engagement with the underside of said step plate and being disposed in assembly below the apex of said end edges of the associated end of said pipe opening, said step plate having first and second stop abutments protruding from the underside thereof adapted to abuttingly engage the apex of the adjacent said first and second end edges of said opening to limit movement of the sub-assembly of said step plate and said support pipe longitudinally relative to said pipe.

13. The combination set forth in claim 4 wherein each of said spring finger catches has a protrusion extending downwardly from said vertex and oriented to provide an extension thereof to thereby assist lead-in entry assembly of said support plate into and past the side edges of said pipe opening during assembly thereinto.

14. The combination set forth in claim 13 wherein said support plate has fore and aft stiffening ribs integrally joined thereto and protruding downwardly from the underside thereof and extending upwardly to a flush relationship with the upper surface of said top walls of said truss means, each said rib extending with its major plane parallel to the axis of said pipe and perpendicular to the plane of said top walls of said support pipe, each said rib also extending beneath an associated one of said end tabs and toward the longitudinal center of said step plate so as to span at least two of said truss means.

15. A method of constructing a vehicle running board construction comprising the steps of:

(1) providing a hollow support step pipe adapted to be secured to a vehicle exterior at first and second longitudinally opposite ends of said pipe, said pipe having an elongated mid-section step portion adapted in vehicle-mounted orientation to extend generally parallel to and adjacent a sill of a vehicle door that provides access to a passenger or freight compartment of the vehicle, (2) forming in said pipe mid-section an elongate mounting opening in an upwardly facing exterior surface area thereof and defined by first and second laterally opposite and longitudinally extending opening side edges both lying in a plane chordally intersecting an upper radial cross sectional segment of said pipe, said opening being defined at opposite longitudinal ends thereof by first and second end edges each extending from said opening side edges to a junction with an uppermost apex area of said upwardly facing exterior surface area of said pipe, (3) providing a support plate having a plurality of truss means dimensioned for straddling said opening side edges and resting thereon for support, and also having a plurality of spacer web means individually interposed between and joined to longitudinally adjacent pairs of said truss means, each of said web means having at each longitudinally opposite end thereof a resilient spring finger catch adapted for underlying an associated one of said pipe opening side edges when in assembly therewith and having a free end adapted for resiliently engaging an interior surface of said pipe for holding said step plate against upward release from said pipe when in assembly therewith, (4) providing a step plate adapted to be mounted on and cover said support plate and said mounting opening of said pipe when in assembly therewith, said step plate having a generally flat planar central step tread portion having an undersurface adapted to bear upon said support plate truss means when in assembly therewith, said step plate also having first and second downwardly extending side flanges adapted to respectively extend outwardly of and downwardly past said first and second pipe opening side edges when in assembly therewith, and each said side flange terminating at a free end edge adapted to resiliently engage the exterior surface of said pipe when in assembly therewith, (5) providing fastening means for securing said step plate onto said support plate, comprising a plurality of retaining barbs extending downwardly from said step plate undersurface adapted for snap lock tang engagement with associated receiving slot anchor tabs provided in said truss means for holding said step plate subassembly on said support plate, (6) forming a sub-assembly of said plates by assembling said step plate onto said support plate by relatively moving said plates bodily toward one another while maintaining their respective longitudinal axes generally parallel until said retaining barbs have fully snap lock engaged said truss means anchor tabs, and (7) forming an assembly of said support pipe with said sub-assembly by relatively moving said sub-assembly and said pipe bodily toward one another with the leading and trailing ends of said sub-assembly and said pipe opening aligned and while maintaining their respective longitudinal axes generally parallel until said free ends of said second legs of said spring catches have been slid past said first and second pipe opening edges and into the interior of said pipe and said step plate side flanges resiliently engage the exterior surface of said pipe.

* * * * *

UNITED STATES PATENT AND TRADEMARK OFFICE
CERTIFICATE OF CORRECTION

PATENT NO.   : 6,173,979 B1
DATED        : January 16, 2001
INVENTOR(S)  : Edward Helmut Bernard Page 1 of 1

It is certified that error appears in the above-identified patent and that said Letters Patent is hereby corrected as shown below:

<u>Column 11,</u>
Line 53, delete "step" and insert -- support --.

<u>Column 14,</u>
Line 9, delete "step" and insert -- support --.

Signed and Sealed this

Twenty-third Day of April, 2002

Attest:

Attesting Officer

JAMES E. ROGAN
*Director of the United States Patent and Trademark Office*